US008604768B2

(12) United States Patent
Dowlatabadi (10) Patent No.: US 8,604,768 B2
(45) Date of Patent: Dec. 10, 2013

(54) CONTROL LOOP FOR SWITCHING POWER CONVERTERS (75) Inventor: Ahmad B. Dowlatabadi, San Jose, CA (US)

(73) Assignee: Aivaka, Inc, San Jose, CA (US)

( * ) Notice: Subject to any disclaimer, the term of this patent is extended or adjusted under 35 U.S.C. 154(b) by 0 days.

(21) Appl. No.: 13/103,808

(22) Filed: May 9, 2011

(65) Prior Publication Data

US 2011/0273150 A1 Nov. 10, 2011

Related U.S. Application Data (62) Division of application No. 10/421,254, filed on Apr. 22, 2003, now Pat. No. 7,940,033.

(51) Int. Cl.
*G05F 1/575* (2006.01)
*G05F 1/656* (2006.01)

(52) U.S. Cl.
USPC ........................................ 323/284; 323/286

(58) Field of Classification Search
USPC ......... 323/222, 223, 224, 282, 284, 286, 288, 323/351
See application file for complete search history.

(56) References Cited

U.S. PATENT DOCUMENTS

| 5,272,614 | A | * | 12/1993 | Brunk et al. | 363/21.05 |
|---|---|---|---|---|---|
| 6,069,807 | A | * | 5/2000 | Boylan et al. | 363/97 |
| 6,204,651 | B1 | * | 3/2001 | Marcus et al. | 323/283 |
| 6,396,716 | B1 | * | 5/2002 | Liu et al. | 363/17 |
| 6,624,619 | B2 | | 9/2003 | Fujita et al. | |
| 6,674,272 | B2 | | 1/2004 | Hwang | |
| 6,906,499 | B2 | | 6/2005 | Hussein et al. | |
| 7,420,357 | B2 | | 9/2008 | Bayer | |
| 7,940,033 | B2 | * | 5/2011 | Dowlatabadi | 323/284 |
| 2008/0265880 | A1 | | 10/2008 | Nishikawa | |

* cited by examiner

*Primary Examiner* — Gary L Laxton
(74) *Attorney, Agent, or Firm* — James E. Eakin (57) ABSTRACT

A pulse regulation loop for a clocked switching power converter where the loop is around a bridge converter. The loop features a comparator, a charge pump and a filter in series, feeding a pulse modulator controlling the clock duty cycle of the bridge. Ripple in the bridge converter output is feed to the comparator which causes the charge pump to inject or remove charge from the filter at the clock rate providing control over the modulator that establishes converter efficiency. The charge pump is of the PLL type, having switches responsive to voltage output from the comparator, evaluating the converter ripple relative to a reference voltage.

6 Claims, 9 Drawing Sheets

//* CONTROL LOOP FOR SWITCHING POWER CONVERTERS

This application is a divisional of U.S. patent application Ser. No. 10/421,254, filed Apr. 22, 2003, now U.S. Pat. No. 7,940,033 and claims the benefit thereof.

FIELD OF INVENTION

This invention relates generally to voltage regulation of switching power converters.

BACKGROUND OF INVENTION

Switching power converters (SPCs) are widely used in electronic systems to convert a direct current (DC) voltage into a different DC voltage, or an alternating current (AC) voltage into a DC voltage, or a DC voltage into an AC voltage. SPCs are widely used in both portable and non-portable applications for a wide range of power and voltage ranges. There are numerous architectures for each application such as buck (step down), boost (step up), H-bridge, and fly back. Yet, regardless of the type of converter, they all need a controller so that a regulated and well maintained voltage at the output is created. The generated output voltage is often used as a power supply to an specific load within the electronic system. There could be different types of SPCs in one system, each with its own particular load and controller and its particular set of specifications.

Figure 1:
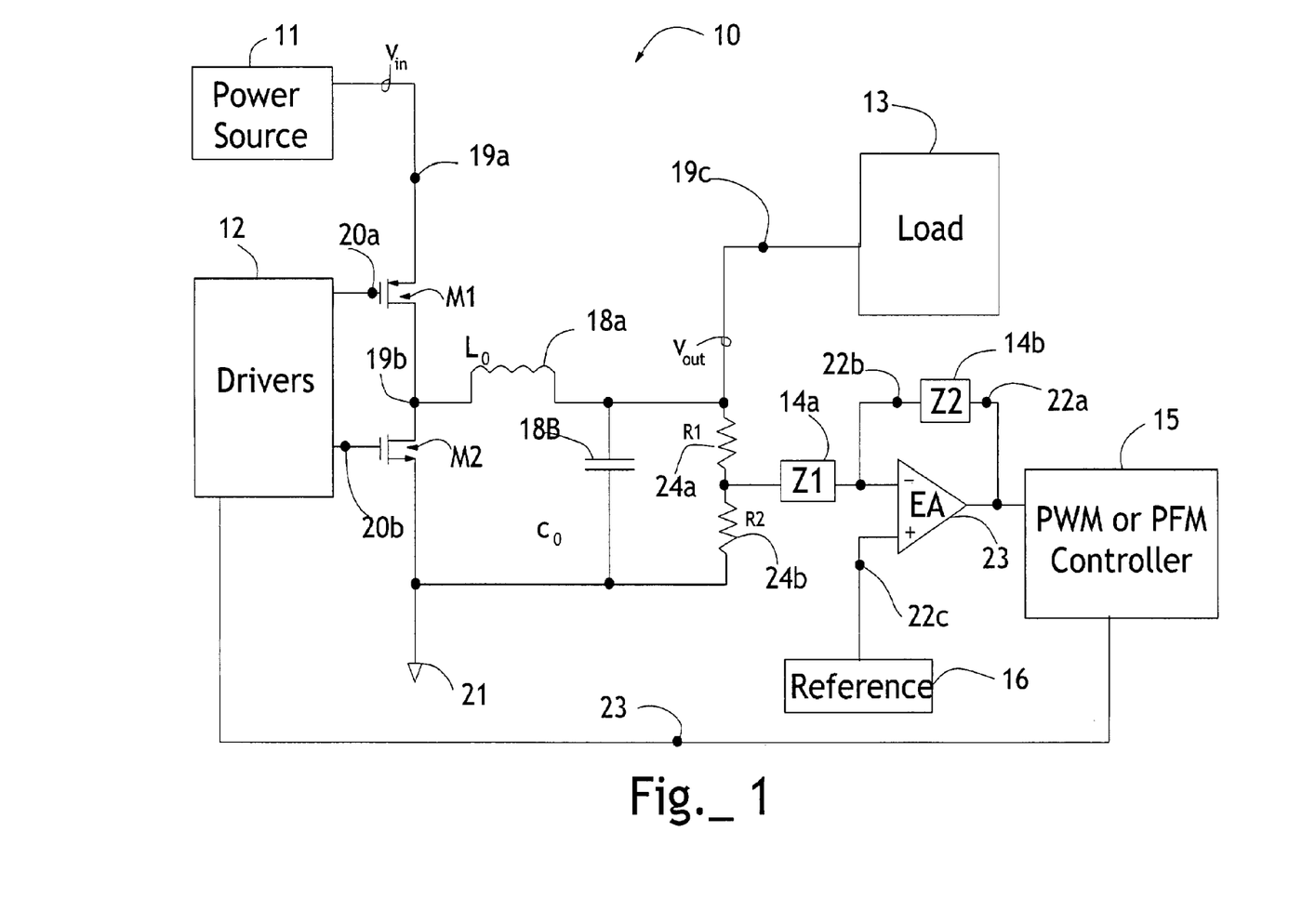
FIG. 1 is a circuit diagram of a buck type of switching power converter of the prior art.

FIG. 1 shows block diagram of a typical prior art step-down (or buck) DC/DC switching power converter (SPC) that converts a DC voltage with value of $V_{in}$ from a power source 11, such as an AC to DC full wave bridge rectifier, into a lowered DC voltage with value of $V_{out}$ (where $V_{out}<V_{in}$). For example, 12V DC input to power source 11 may be converted to 10V. DC output as $V_{in}$. A prior art power converter might convert $V_{in}$ to a DC output voltage, $V_{out}$, of 2 volts DC. The core of a buck SPC is made of two transistor switches; M1 and M2, along with inductor 18A, having a value $L_0$, and capacitor 18B, having a value $C_0$. Transistor M1 can be either a p-channel or a n-channel device, while M2 is customarily a n-channel device. The type selection for M1, between n-channel or p-channel, is heavily dependent on design requirements and availability of devices within the system.

Figure 2:
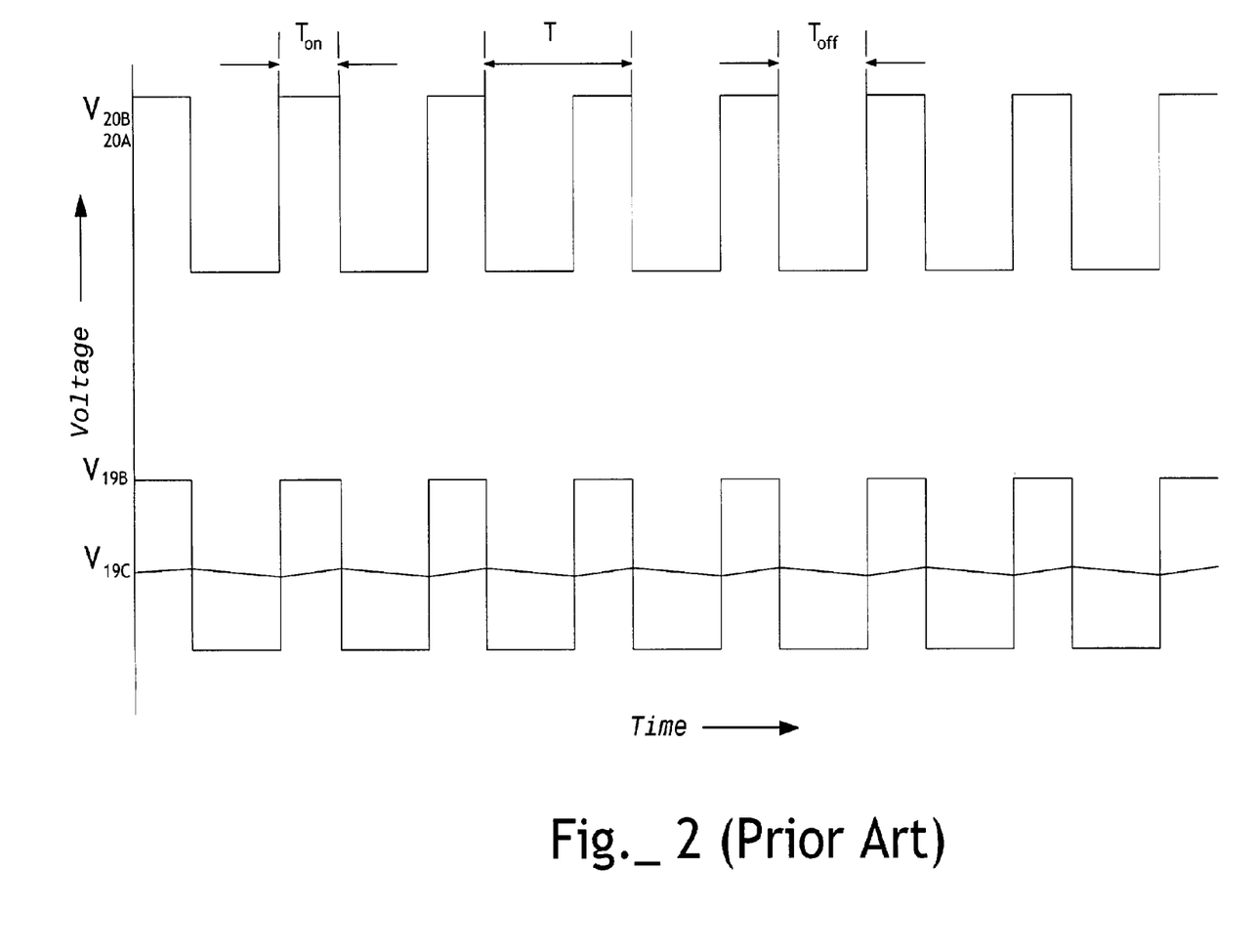
FIG. 2 is a timing diagram of voltage versus time at various nodes in the circuit of FIG. 1.

FIG. 2 shows a timing diagram of voltages at nodes 19B, 19C ($V_{out}$), 20A and 20B during a steady state condition of the SPC of FIG. 1. By opening and closing transistor switches M1 and M2 in a complementary fashion, at a rate set by a clock oscillator associated with drivers 12 in FIG. 1, where only one device is on at any given moment, the voltage at node 19B would be a pulse with the same frequency of the signal at node 20A or 20B. Yet, the magnitude of the voltage at node 19B would alter from zero to $V_{in}$. This pulse voltage would be filtered by inductor 18A and capacitor 18B at node 19C to an approximate value of $$V_{out}=V_{in}(T_{on}/T) \qquad (1)$$

where $T_{on}$ is the duration for which M1 is kept conducting (in this case while signal at node 20A is at zero), and T is the total period of signal at node 20A (or period of signal at node 20B). Referring to FIG. 2, the ratio of $T_{on}/T$ is called "duty cycle" of the clock. So, for a 20 percent "duty cycle", output voltage $V_{out}$ would be $V_{out}=0.2V_{in}$ assuming no losses.

Returning to FIG. 1, a regulation loop for a prior art SPC is often made of an error amplifier (EA) 23, having an input load Z1, represented by block 14A, and a feedback load Z2, represented by block 14B, a pulse width modulator (PWM) or a pulse frequency modulator (PFM) controller 15, and a driver 12 to turn M1 and M2 on and off. The error amplifier may be an analog or digital device which evaluates a sample of power ripple on one input to the error amplifier versus a reference voltage on node 22C from a reference supply 16. This regulation configuration is frequently seen in buck, boost, and fly-back switching power converter designed of the prior art. An entire SPC system can be built on a printed circuit board using discrete components or it can be built as an integrated circuit using CMOS, BiCMOS, BCD, or any other process technology suitable for such a design.

Referring again to FIG. 2, if value of T is held constant for a constant clock period, or frequency, and $T_{on}$ (or $T_{off}$) is varied to control voltage at node 19C ($V_{out}$) then the controller is called a PWM or pulse width modulator controller. Yet, if T is varied and $T_{on}$ (or $T_{off}$) is held constant, then the controller is a PFM or pulse frequency modulator controller. In either case, PWM or PFM, transistor switches M1 and M2 are operated in a manner that creates a voltage pulse at node 19B. Inductor 18A, having a value $L_0$, and capacitor 18B, having a value $C_0$, are connected in a manner to form a low-pass filter so that pulse signal at node 19B is converted into a fairly constant DC voltage at 19C defined by Equation 1 and depicted in FIG. 2. Voltage at node 19C is used to power up any possible load, such as load 13.

Using small-signal analysis, the low-pass filter created by inductor 18A and capacitor 18B produces two poles at $f_{p1}$, and $f_{p2}$ that can be calculated from $$f_{P1} = f_{P2} = \frac{1}{2\pi\sqrt{L_0 C_0}} \qquad (2)$$

Now, since there are two poles within the regulation loop, this system would be unstable in a closed loop configuration if there is no change made to the loop. So, the loop must be compensated.

Referring again to FIG. 1, error amplifier 23 along with two loads 14A and 14B, with values Z1 and Z2, respectively, serve as the main compensation circuitry to add stability to the loop. This is a very commonly practiced scheme to compensate a SPC regulator loop. Using small-signal analysis, in the frequency domain, the voltage gain of error amplifier 23 considering its loads can be calculated as $$A_1 = \frac{-Z2}{Z1} \qquad (3)$$

By using a proper combination of active and passive components, primarily capacitors and resistors for loads Z1 and Z2, proper additional poles and zeros can be added within the regulation loop in order to stabilize it.

Figures 3, 4:
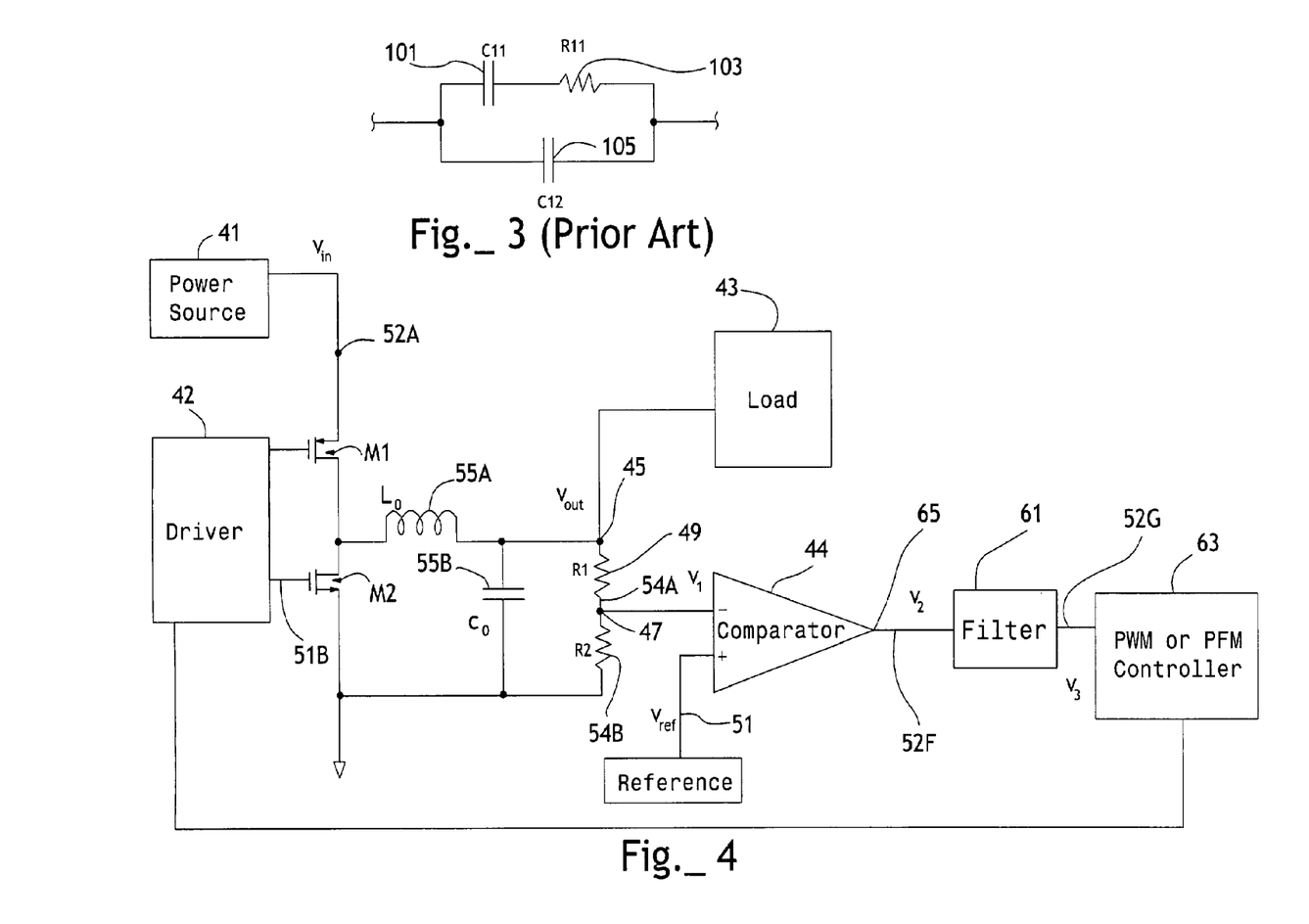
FIG. 3 is a circuit diagram of a complex impedance load for an error amplifier of the prior art.
FIG. 4 is a circuit diagram of a boost type of switching power converter with a stabilization loop of the present invention.

FIG. 3 shows one possible method of implementing a complex value for Z2 with a capacitor 101, having a value $C_{11}$, in series with a resistor 103, having a value $R_{11}$, both the capacitor 101 and resistor 103 in parallel with capacitor 105, having a value of $C_{12}$. So. assuming a simple resistor is used for Z1 with value of $R_{Z1}$, and assuming Z2 is set to be a combination of one resistor and capacitors shown in FIG. 4, then $A_1$ (in Equation 3) is $$A_1 = -\frac{1 + sRC_{11}}{R_{Z1}s[sRC_{11}C_{12} + (C_{12} + C_{11})]} \quad (4)$$

with one zero at $1/(2\pi RC_{11})$, and two poles. However, it must be noted that the DC voltage gain of error amplifier 23 is simply equal to its open loop voltage gain, and is not calculated from Equation 4. Furthermore, capacitor 18B, in FIG. 1, having value $C_O$, has series parasitic resistances, not shown in FIG. 1, with a value of $R_{ser}$ which would add another zero at $1/(2\pi C_O R_{ser})$. There are effectively two poles created by $L_O$ and $C_O$ (at $f_{P1}$ and $f_{P2}$), and two additional poles created by Z1 and Z2 which yield a number of poles totaling four, with two zeros within the loop. Hence, by adjusting the values of passive components $L_O$, $C_O$, (both associated with the bridge converter), $C_{11}$, $C_{12}$, $R_{11}$, (the latter three values seen to be associated with the components of FIG. 3), and $R_{Z1}$, (the resistance value of the impedance Z1 in block 14A of FIG. 1) a regulation loop can be compensated to ensure a stable operation for all conditions.

The same analysis can be used for any other converter such a fly back, or H-bridge which uses this common type of regulation. One of the main problems in a regulation loop is the error amplifier itself. The error amplifier must have a high voltage gain, and adequate bandwidth in order to be effective. If the voltage gain or speed of the error amplifier is compromised for any reason, then additional error terms are introduced, which in turn may not produce a stable controller. So, performance of the error amplifier is a very crucial and important issue that must be considered for any regulator.

A power supply for an amplifier plays a very crucial role in its gain and bandwidth. A reduced power supply voltage often lowers either the gain or speed, or both gain and speed. Traditionally, error amplifiers in a regulation loop need a minimum power supply voltage of around 2V to operate properly. Furthermore, in a typical buck SPC the entire regulation loop may be powered by the provided power source, which has a value of $V_{in}$. Thus, the minimum voltage for power source or ($V_{in}$) is often limited to around 2V for a conventional buck SPC. So, if value of $V_{in}$ drops below this critical limit of around 2V then error amplifier that is used in the buck SPC regulation loop could have a reduced voltage gain or bandwidth, which could hinder the performance of the entire converter, or may prevent operation of the converter.

In a boost converter, where $V_{in}$ is increased to a larger value at the output and $V_{out} > V_{in}$, if $V_{in}$ is less than a critical voltage which is need to run all of the internal circuitry, such as error amplifier or reference circuitry, then the output voltage $V_{out}$ may not be regulated until its value reaches an specific value high enough that can be used as the power source to the regulator itself. Then, the loop is activated to regulate value of $V_{out}$ at its targeted value.

Thus, general use of an architecture similar to that shown in FIG. 1 in buck SPCs is limited mainly to system where $V_{in}$ is, at a minimum, around 2V.

Nevertheless, there are applications where a buck SPC is needed to convert a lower voltage power source, such as household batteries that are used as a main power source. In this case $V_{in}$ could be as low as 1.3V. A desired output voltage ($V_{out}$) could be anything from 1.2V to as low as 0.4V.

In such systems, one available scheme could be simply to use a linear voltage regulator. However, efficiency linear voltage regulators is approximated by $$\eta = V_{out}/V_{in} \quad (5)$$

where $V_{in}$ and $V_{out}$ are their respective input an output voltages. Thus, linear regulator are considered very inefficient for large voltage drops and may not be suitable for a system where $V_{in}=1.3V$ and $V_{out}=0.65V$, since $\eta=50\%$. An SPC efficiency should be as high as 95% for similar voltage drop ratios. Another available method could be to employ a boost SPC to increase the provided power source by stepping up a value of $V_{in}$ as previously mentioned to voltage of around 2V, or higher, and then use a buck SPC to regulate the created 2V level back to a voltage lower than the initial $V_{in}$. Such an approach would need two sets of SPCs which increases the cost and would reduce the entire efficiency of power converter circuitry. This may not be acceptable, yet it could be the only effective "efficient" solution.

Other approaches to regulate a SPC involve using a digital architecture. In some digital schemes a PLL has been used to monitor and adjust a power supply for a digital system. The goal was to "dynamically" adjust $V_{out}$ in order to optimize the power consumption of the load which were a large digital circuits. Hence, these approaches are not used to keep $V_{out}$ at a constant value, but to change it according to the need of an specific digital load in order to minimize the amount of power consumed within such load, such as a micro-controller or microprocessor circuits. An analog-to-digital converter (ADC) has been used to sample the output voltage of a circuit and voltage regulation was done through digital circuitries. However, the input voltage was still kept to a value around 3V to keep an analog-to-digital converter operational. The cost of the die was fairly large.

An object of the invention is to create a new control loop to regulate the output voltage of a switching power converters (SPC), even at low input power supply voltage, particularly lower than 2V, to reduce design complexity, and to lower power consumption and facilitate design portability of the regulator between different manufacturing methods and processes (i.e. CMOS, BiCMOS and such).

SUMMARY OF THE INVENTION

The above object has been satisfied with a control loop for a SPC that uses a bridge rectifier to provide rectified DC to a filter loop having a simple voltage comparator instead of a traditional operational amplifier, along with a simple filter to linearize nonlinear response of the comparator. The filter has poles and zeros offsetting the poles and zeros of the bridge rectifier to promote stability in the loop. The new circuit can tolerate process, temperature and voltage variations, and is capable of operating with reduced power supply voltage with no degradation in performance. The circuit can easily be ported into different technologies without major design modifications. The circuit can be applied to any SPC circuit including DC-DC, DC-AC and AC-DC converters. By using this new regulation circuit the power supply voltage applied into the SPC can easily be lowered without harming regulated $V_{out}$.

DETAILED DESCRIPTION OF THE PREFERRED EMBODIMENT

With reference to FIG. 4, the present invention came about with the realization that the function of the linear error amplifier 23 in FIG. 1 and the compensation loads Z1 and Z2 can be replaced with a simple high gain detection circuit with a non-linear response, and a proper filter to create a pseudo linear behavior to regulate the loop. At very low frequencies near DC, the error amplifier behaves like a simple voltage comparator with a very large voltage gain. Yet, it is only at higher frequencies that it can assist in compensating the loop. So, the same behavior can be implemented with components that may not suffer from shortcomings of typical error amplifiers. A non-linear detection circuit such as a voltage comparator is typically more robust to variations in headroom voltage, temperature, and process variations. Hence, its adaptability to these changes can be used to make the entire compensation loop more robust.

Figure 6:
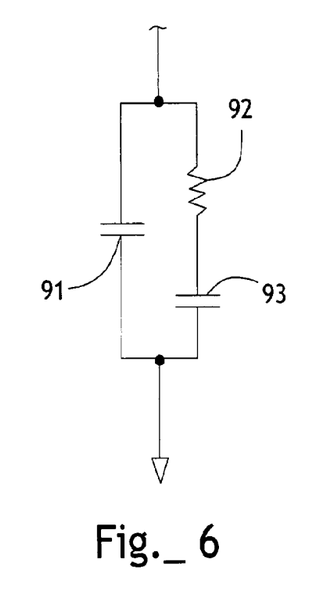
FIG. 6 is a circuit diagram of a typical filter in the stabilization loop of FIG. 4, 5, or 7.

A high gain voltage comparator 44 is used to detect an error involving output voltage ($V_{out}$) at node 45 or a fraction of it, at node 47 after a portion of the output voltage at node 45 is dropped across resistor 49. This first voltage is a first input to comparator 44. A second input is a reference voltage on line 51. Assuming that the voltage comparator has a sensitivity of $\epsilon$ (where $\epsilon \cong 0$) and has very small propagation delay, then if the first voltage is greater than the second, then the comparator output, V2, is at logic level 0, and when the first voltage is less than the second, the comparator output, V2, is at $V_{in}$, logic level 1. So, V2 can be viewed as a pulse voltage modulating from a positive voltage to zero or a negative voltage (if the comparator is powered by two separate power supplies, one positive and one negative). This pulse can be a few volts in magnitude. If the comparator is solely powered with a single power source such as $V_{in}$, then the pulse would merely vary from zero to $V_{in}$. By placing a simple low-pass filter in the path of the comparator, not shown, the pulse voltage at the comparator output node 65, V2, can be averaged out to create a fairly constant voltage which can be fed into the PWM or PFM controller 63 to eventually regulate the loop. Conceptually, the comparator 44 and filter 61 would effectively replace the error amplifier 23 and its loads Z1 and Z2 in FIG. 1. The primary goal is to create a constant voltage at the input of PWM or PFM controller 63 so the loop is stabilized. However, the same issues related to the poles and zeros in the regulation loop still exist and must be dealt with. The filter block inside FIG. 4 can be built to have the following response:

$$H_{(s)} = \frac{1 + s/\omega_{z1}}{(1 + s/\omega_{p1})(1 + s/\omega_{p2})} \quad (6)$$

where $H_{(s)}$ is the output transform of the filter, s is a complex variable and w is a frequency term ($\omega_{z1}$ being a frequency term associated with a pole and $\omega_{p1}$ and $\omega_{p2}$ being frequency terms associated with pole one and pole two respectively, such that the inverse Laplace transform $L^{-1}[H_{(s)}]$ yields expressions that characterize behavior of filter components in the time domain, such as a circuit arrangement of capacitors, inductors and resistors. Equation 6 is similar to Equation 4 and it is the simplest form of such filter, with one zero and two poles. One such filter network could be similar to the circuit shown in FIG. 3, with one end of it connected to ground, as shown in FIG. 6. One main issue of implementing the filter is the magnitude of $V_2$, the voltage of comparator output node 65. Since magnitude of $V_2$ is modulated from zero to $V_{in}$ or −5 volts to +5 volts, the voltage at input node 52A can cause a challenge in design, despite that fact it can be viewed as a constant for a short period of time. However, if a battery is used as power source for the power converter, its output voltage will normally change as charge is depleted. So, even though implementing a filter with a variable $V_{in}$ is possible, it still can be difficult task from practical point of view.

Figure 5:
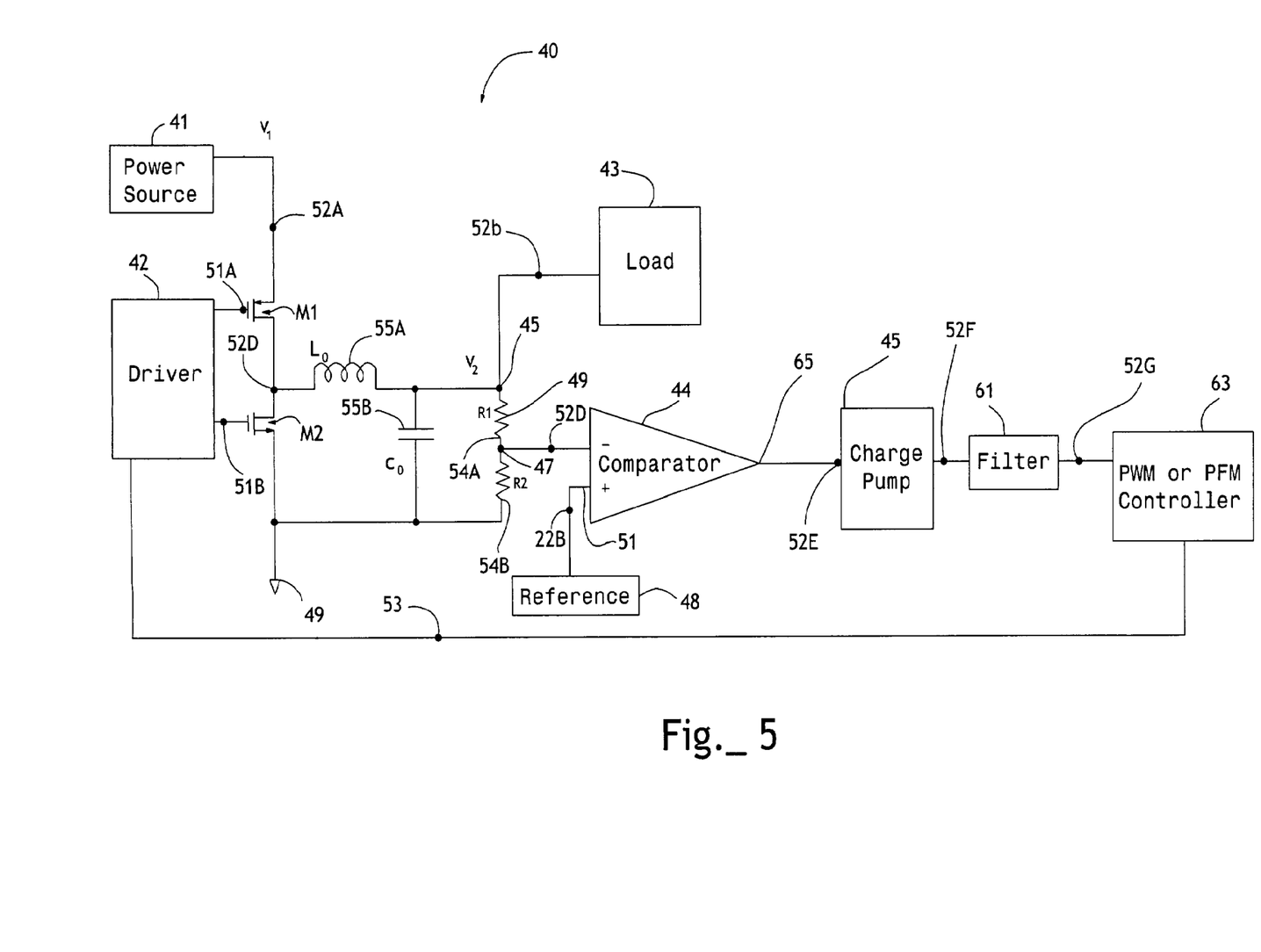
FIG. 5 is a circuit diagram of an alternate switching power converter with a stabilization loop of the present invention, including a charge pump.

A simpler approach would/be to insert a simple charge-pump circuit 45 in FIG. 5 that can add (or remove) a constant amount of charge into or out of a node, depending of magnitude of $V_2$, the voltage on node 65 at the output of comparator 44. Then, in accordance with the invention, a stabilized regulation loop includes a comparator, a charge-pump and a filter to deal with that constant yet modulating charge instead of dealing with a pulse-like voltage, $V_2$. A charge-pump is commonly used in the design of traditional phase locked loops (PLLs) where the phase or frequency of a reference clock is compared to the phase or frequency of the generated clock signal out of a voltage controlled oscillator (VCO) and accordingly, charge is added or subtracted from a node by the charge-pump. Note that this type of "charge pump" is different from another type of charge pumps used to increase voltage from a low value to a high value using a series of phased switches controlling charge transfer from connected capacitors. The present invention employs charge adding and subtracting charge pumps, not the other type of charge pump. So, this particular approach with some simple modifications can easily be applied here in SPC regulation design.

Figure 7:
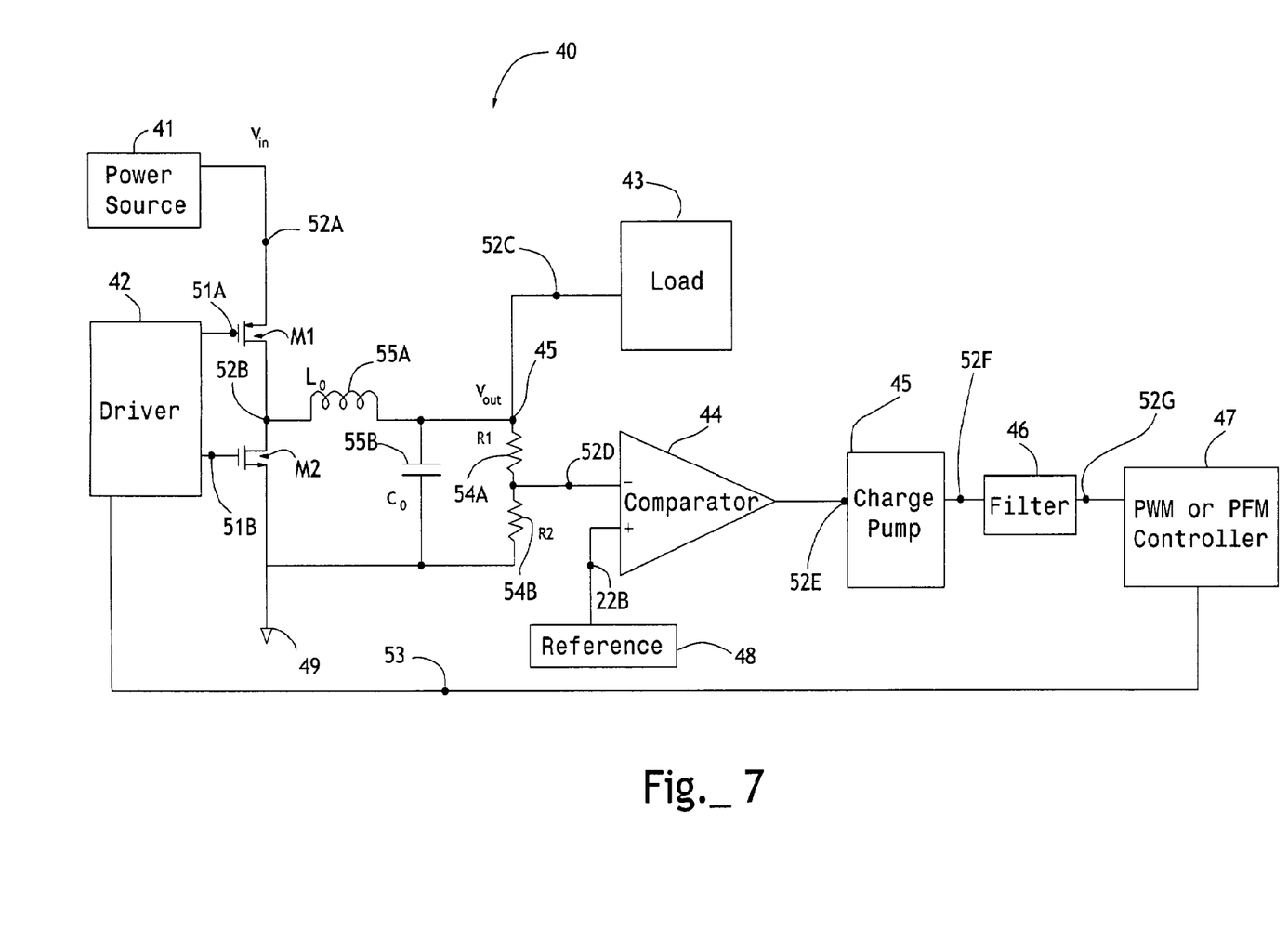
FIG. 7 is a circuit diagram of a switching power converter with another embodiment of a stabilization loop of the present invention.

Referring to FIG. 7, power source 41 may be a full wave bridge converting an AC voltage to some DC level. This DC level is being regulated by a buck SPC which is made of two transistors switches M1 and M2. M1 is shown as a p-channel device and M2 is shown as a re-channel device for this example, yet both can be re-channel devices if needed with some possible extra circuitry to drive M2.

Transistors M1 and M2 are connected to inductor 55A, having a value $L_0$, and capacitor 55B, having a value $C_0$. Input voltage at node 52A with value of $V_{in}$ is reduced to a lower voltage at node 52C with value of $V_{out}$ and can be connected to a possible load, in this case load 43. Value of $V_{out}$ is regulated by a loop that is made of components that can either be built on a printed circuit board or in an integrated form in CMOS, BiCMOS, or bipolar processes (or any other technology suitable for such a design such as silicon carbide, silicon-on-insulator, silicon germanium, and bipolar-CMOS-DMOS).

A network is used to provide a voltage which is directly proportional $V_{out}$, in this case with two series connected resistors 54A and 54B, having respective values R1 and R2. The voltage at node 52D and the reference voltage provided by reference voltage supply 48 at node 22B from reference supply 48 are compared to each other by voltage comparator 44. Voltage comparator 44 compares these two voltages at nodes 52D and 22B and provides a signal at its output at node 52E. If voltage at node 52D ($V_{52D}$) is larger than voltage at node 22B ($V_{22b}$) then voltage at node 52E ($V_{52E}$) is set to a logic zero. However, if $V_{52D}$ is less than $V_{22B}$, then $V_{52E}$ is set to a logic 1. The comparator is connected to a charge-pump which can provide or remove charge to or from node 52F.

Figure 8:
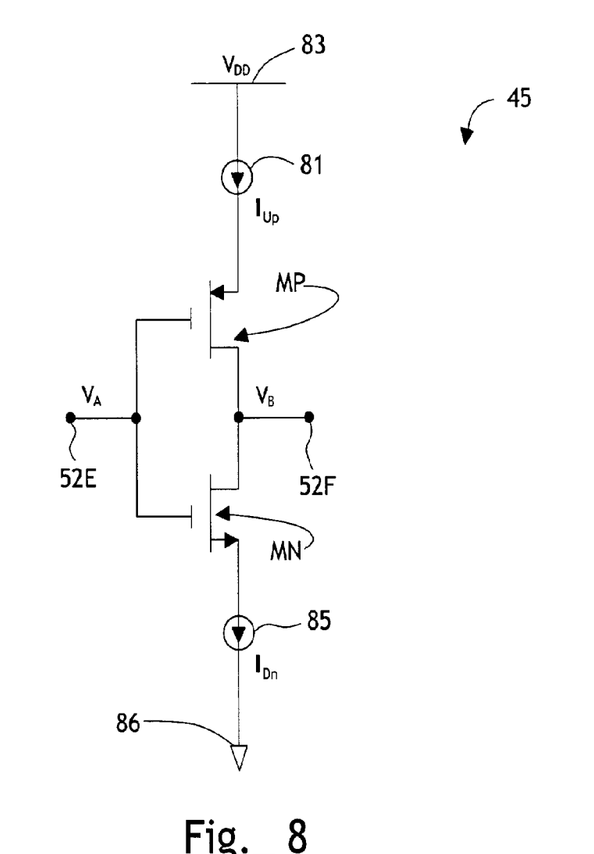
FIG. 8 is a circuit diagram of a charge-pump used in the circuit of FIG. 7.

Now, at simple circuit diagram shown in FIG. 8 illustrates a charge-pump used herein. If the comparator 44 output voltage at node 52E is at 0, then current $I_{up}$ generated by charge-pump 45 flows into node 52F. Assuming capacitor 91 in the filter of FIG. 6, having value $C_{12}$, is much larger than capacitor 93, having value $C_{11}$, then the voltage variation at the output node 52F of charge-pump 45 for $V_{52E}$=0 would be $$\Delta V_{52F}=(I_{up}T_{up})/c_{12} \quad (7)$$

where $I_{up}$ if value of current source in charge-pump 45 and $T_{up}$ is the duration for which $I_{up}$ if flowing into node 52F. And if the output of comparator 44 is high, i.e. $V_{52E}$=1, then capacitor $C_{12}$ would be discharged by an amount calculated by $$\Delta V_{52F}=(I_{dn}T_{dn})/C_{12} \quad (8)$$

similarly, $I_{dn}$, and $T_{dn}$ are values of current sink and the duration for charge-pump 45 in which $I_{dn}$ is flowing out of $C_{12}$, respectively. It must be noted that in the frequency domain, a single capacitor would add another pole to the regulation loop which would cause an additional reason for the entire system to be unstable and is not recommended for this system. Filter 46 must be able to smooth the voltage at node 52F, and in frequency domain provide a zero to compensate the loop and prevent oscillation.

By using a frequency domain analysis, a zero is added at $$f_{Z1} = \frac{1}{2\pi RC_{12}} \quad (9)$$

where $f_{Z1}$ is the frequency of the zero and a single pole is added at $$f_{P3} = \frac{C_{11} + C_{12}}{2\pi RC_{11}C_{12}} \quad (10)$$

where $f_{P3}$ is the frequency of the added pole. Thus, by selecting proper values for R, $C_{11}$, and $C_{12}$ values of the created pole and zero can be placed such that an stable system is obtained. Furthermore, parasitic resistance of the output capacitor 55B, having value $C_0$, would add an extra zero within the network that would be used in stabilizing the system, along with the values of $C_{11}$, $C_{12}$, and R).

Values of $I_{dn}$ and $I_{up}$ would contribute to the overall gain of system in frequency domain or in time domain. By increasing their values, overall gain is increased and the locations of poles and zeros must be modified in response to those changes. Consequently, all of these parameters become design criteria and must be dealt with for any system.

Clearly a voltage comparator is inherently a non-linear circuit, unlike an error amplifier. However, it must be noted that an error amplifier that operates as an open loop can be used in a voltage comparator mode within this system, without any noticeable problem. So, voltage comparator 44 can be of any manner and design, as long as it can perform the voltage detection needed in this system, as described above.

Filter 61 is used to smooth the voltage created at node 52F, the charge-pump output, and apply it to a controller block. Voltage at node 52F out of filter 61 is applied to PWM or PFM controller 63 which provides the needed signals through data line 53 to driver 42. The controller controls the duty cycle for transistor switches M1 and M2 established by driver 42.

FIG. 8 shows a simplified operational diagram of a well known charge pump used in FIG. 7 having a characteristic design primarily used in phased lock loop (PLL) and delay locked loop (DLL) systems. Any circuit that can perform the function of injecting and retracting current or charge, through a constant current source, such as switch MP, and sink, such as switch MN, could be used as the charge-pump within the system 40.

In operation, charge-pump 45 has an input node 52E having a voltage, $V_A$, from the comparator 44 in FIG. 7. This voltage is either high or low, say 2 volts or zero volts. A high voltage signal causes transistor MP and MN to pull current, $I_{up}$ from current source 81 associated with bias voltage supply $V_{DD}$ at terminal 83. The current $I_p$ flows through transistor 81 and toward output terminal 52F. Because comparator 44 is being driven by a signal with ripple from a half bridge or similar converter, the comparator output can rapidly fluctuate high and low. This causes short bursts of current $I_p$ to be delivered to node 52F. When the comparator output is low, the transistors sink current $I_{Dn}$ into current sink 85 toward ground terminal 86. The current $I_{Dn}$ is pulled from node 52F.

Variations on the charge-pump construction are many. Filter 46 in FIG. 7 is of the type commonly used in the design of PLL systems. FIG. 6 shows the simplest circuit that can be used for the filter, with a capacitor 91 in one branch in parallel with a second branch having resistor 92 in series with capacitor 93. However, there are many variations on this filter and other filters can provide the needed poles and zeros and smooth out the voltage at node 52F by providing an additional zero in the stabilization loop to stabilize the entire regulation loop.

Controller 47 in FIG. 7 can be either a PFM or PWM modulator. Driver 42 in FIG. 7 amplifies pulses that can have either fixed frequency and variable width (PWM), or fixed pulse width and variable frequency (PFM) established by controller 47. The controller 47 adjusts pulse width for a PWM or pulse frequency for a PFM. Reference voltage 48 sets a target voltage, adjusted for voltage drop R1 of resistor 54, for $V_{out}$ at node 52C. The controller 47 is making adjustments to driver 42 to minimize the ripple in $V_{out}$ at node 52C and into load 43. The invention would work with either a PWM or PFM, and for any SPC converter. The present invention provides a stabilized regulation loop for a SPC with a non-linear voltage comparator, a charge-pump of the type commonly used in PLL circuitry, and a low pass filter with the combination having poles and zeros offsetting the poles and zeros of the bridge rectifier. Blocks that are typically used in the regulation loop shown in system 40 such as voltage comparator 44, charge-pump 45, filter 46 and PWM or PFM controller 47 and driver 42 are common circuitry.

In general, system 40 may be built on PC board from discrete components, or in an integrated circuit form in any technology suitable for such a system, such as but not limited to CMOS, BiCMOS, GaAs, Bipolar (or BJT), SiGe, Silicon on Insulator (SOI), or any other integrated circuit process capable of producing system 20 in an integrated form. Or, entire system 20 can be built as a combination of discrete components and integrated circuits built in different process technologies that are proper for such a system.

Figure 9:
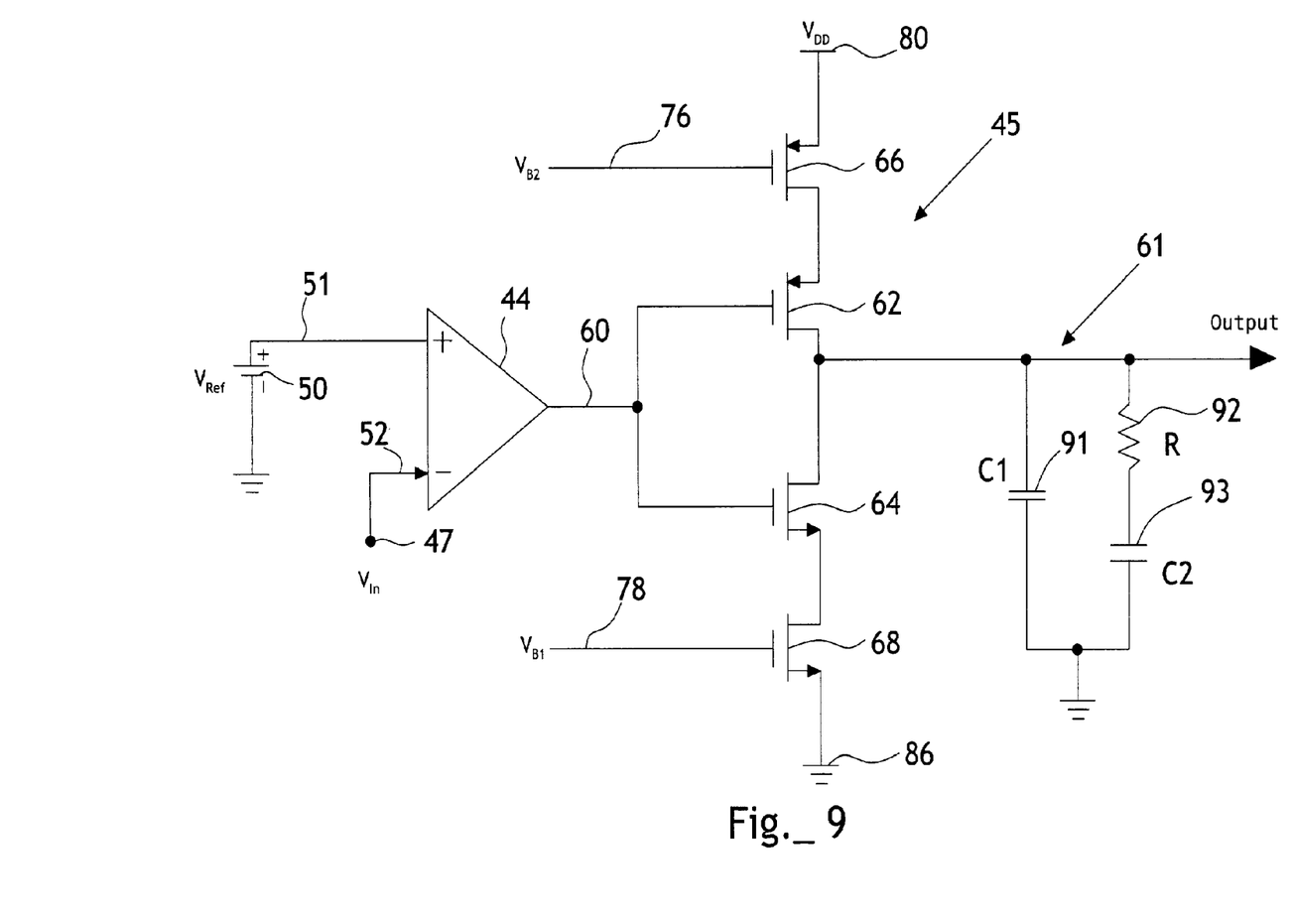
FIG. 9 is a circuit diagram of principal regulation components shown in the stabilization loop illustrated in FIG. 7.
Figure 10:
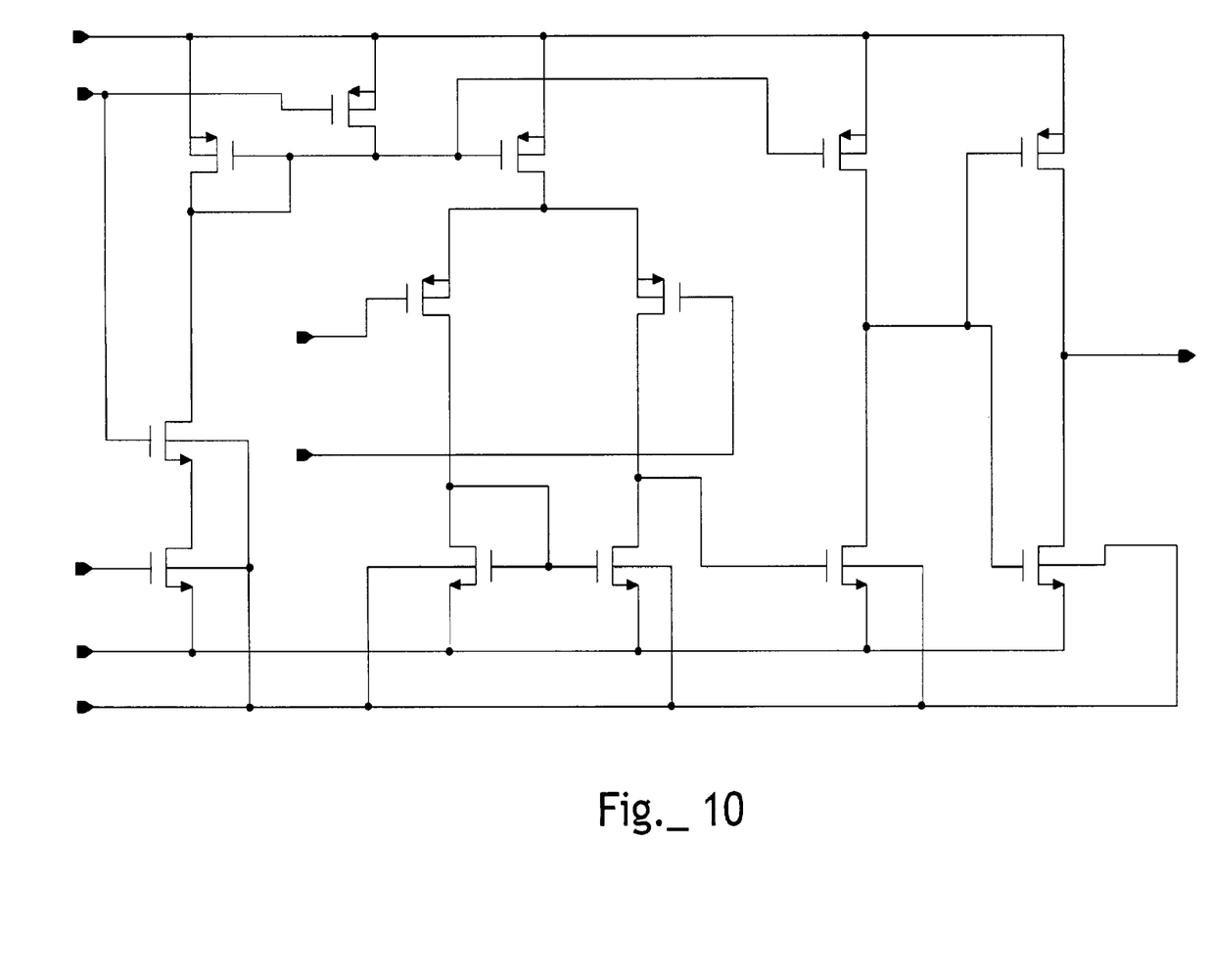
FIG. 10 is an expanded circuit diagram of showing a voltage comparator illustrated as a block in FIG. 9.
Figure 11:
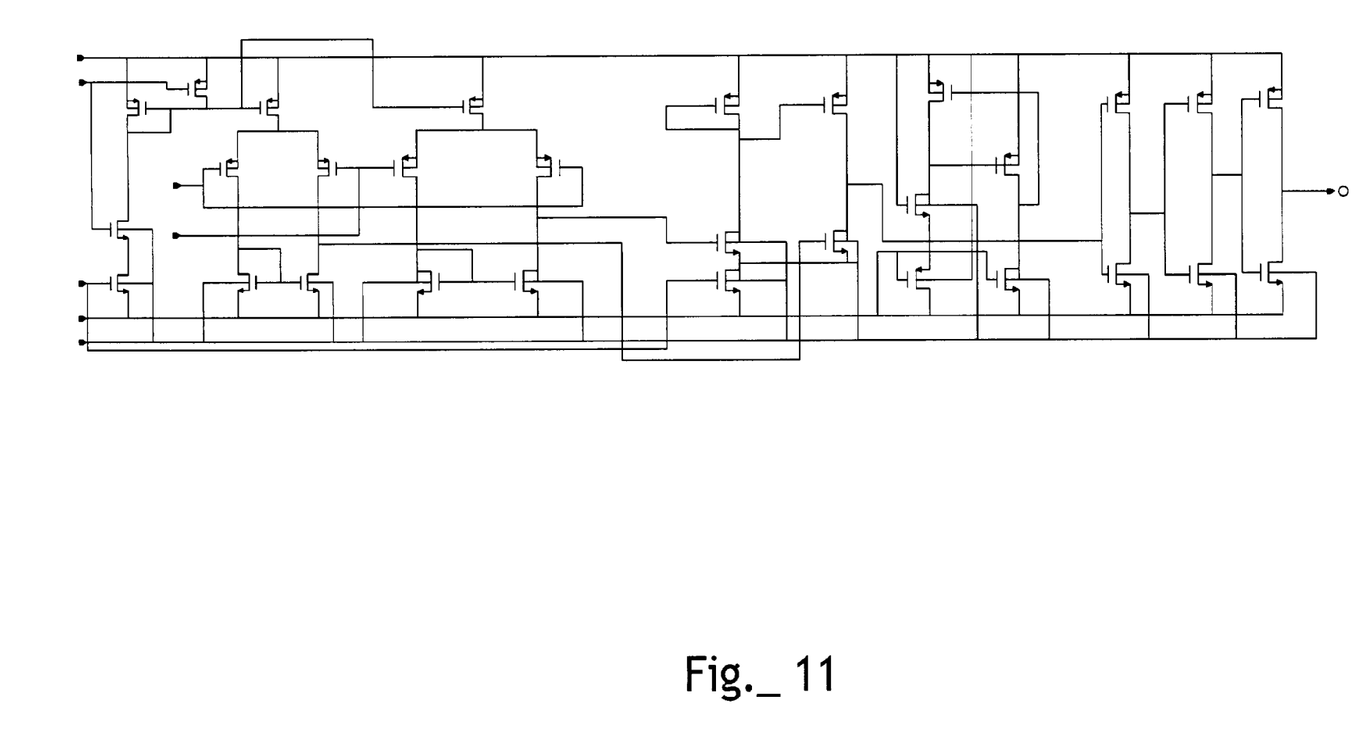
FIG. 11 is a further expanded circuit diagram showing the voltage comparator illustrated in FIG. 10.

With reference to FIG. 9, comparator 44 is to have a voltage signal input 52 from terminal 47 where terminal 47 is an output node of a bridge converter, such as a half-bridge, as seen in FIG. 5. Comparator 44 also has a reference voltage input on line 51 associated with a voltage reference source, such as battery 50. Comparator 44 is made of a plurality of CMOS transistors of the type shown and described in U.S. Pat. No. 6,198,312. A more elaborate version of such as comparator is shown in FIG. 10 and a still more sophisticated version is shown in FIG. 11.

The output of comparator 44 on line 60 feeds charge pump 45, similar to the charge pump shown in FIG. 8. The charge pump features a pair of CMOS transistor switches 62 and 64. Transistor 62 is a p-channel device connected to a p-channel current sourcing transistor 66 biased by a reference voltage on gate line 76 to provide a supply voltage 80 and current when the gate of switch 62 is biased negative. The provided current flows toward filter 61 and specifically into capacitors 91 and 93. Transistor 64 is an n-channel device connected to an n-channel current sinking transistor 68 biased by a reference voltage on a gate line 78 to provide access to ground 86 for sinking current when the gate of switch 64 is biased positive by the output of comparator 44. In this case, current is drawn from filter 61. The filter 61 is shown to be the same as the filter of FIG. 6. This filter is a typical simple filter and equivalent filters, more or less sophisticated, analog or digital, may be used. So feedback from the pulse modulator appear at terminal 47 of comparator 44, at the clock rate, causing small amounts of current to be injected into or removed from filter 61. Since filter 61 has components selected to provide offsetting poles and zeros to counterparts in the power supply, a stable feedback loop is provided.

The invention claimed is:

1. A method for regulating voltage in switching power converters comprising the steps of
   receiving a DC reference voltage on a first input,
   receiving on a second input a signal representative of an output voltage,
   generating, as a first stage output, a first logic signal if the first input is greater than the second input, and a second logic signal if the second input is greater than the first input,
   continuously converting the first stage output to charge, and
   outputting, as a function of the charge, a control signal adapted to control duty cycle of either a pulsewidth modulator or a pulse frequency modulator to cause a voltage applied to a load to be substantially constant.

2. The method of claim 1 wherein the voltage applied to the load is substantially constant at a voltage less than a supply voltage.

3. The method of claim 1 wherein the voltage applied to the load is substantially constant at a voltage greater than a supply voltage.

4. A method of regulating voltage output for use with switching power converters comprising the steps of
   receiving a DC reference voltage on a first input,
   receiving on a second input a signal representative of an output voltage,
   generating, as a first stage output, a first logic signal if the first input is greater than the second input, and a second logic signal if the second input is greater than the first input,
   continuously converting the first stage output to current, and
   outputting, as a function of the current, a control signal adapted to control duty cycle of either a pulsewidth modulator or a pulse frequency modulator to cause a voltage applied to a load to be substantially constant.

5. The method of claim 4 wherein the voltage applied to the load is substantially constant at a voltage less than a supply voltage.

6. The method of claim 4 wherein the voltage applied to the load is substantially constant at a voltage greater than a supply voltage.

* * * * *